United States Patent
Harsany et al.

(10) Patent No.: US 10,956,575 B2
(45) Date of Patent: Mar. 23, 2021

(54) DETERMINE MALWARE USING FIRMWARE

(71) Applicant: HEWLETT PACKARD ENTERPRISE DEVELOPMENT LP, Houston, TX (US)

(72) Inventors: John Scott Harsany, Houston, TX (US); Suhas Shivanna, Bangalore (IN); Luis E Luciani, Jr., Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 215 days.

(21) Appl. No.: 15/817,638

(22) Filed: Nov. 20, 2017

(65) Prior Publication Data

US 2019/0156039 A1 May 23, 2019

(51) Int. Cl.
| | | |
|---|---|---|
| *H04L 9/00* | (2006.01) | |
| *G06F 21/57* | (2013.01) | |
| *G06F 21/56* | (2013.01) | |
| *H04L 29/06* | (2006.01) | |
| *G06F 21/60* | (2013.01) | |

(52) U.S. Cl.
CPC ............ *G06F 21/575* (2013.01); *G06F 21/56* (2013.01); *G06F 21/568* (2013.01); *H04L 63/1491* (2013.01); *G06F 21/60* (2013.01); *G06F 2221/034* (2013.01)

(58) Field of Classification Search
CPC ............ H04B 17/00; G06F 13/00; H04L 1/00
See application file for complete search history.

(56) References Cited

U.S. PATENT DOCUMENTS

| | | | |
|---|---|---|---|
| 7,725,937 B1 * | 5/2010 | Levy | G06F 21/554 |
| | | | 713/187 |
| 8,156,556 B2 | 4/2012 | Krishnamurthy | |
| 8,181,250 B2 | 5/2012 | Rafalovich | |
| 9,473,520 B2 | 10/2016 | Dixon | |
| 9,817,975 B2 * | 11/2017 | Liu | G06F 21/566 |
| 2011/0099620 A1 | 4/2011 | Stavrou | |
| 2012/0255010 A1 | 10/2012 | Sallam | |
| 2016/0267274 A1 * | 9/2016 | Gschwind | G06F 9/4408 |
| 2016/0267275 A1 * | 9/2016 | Gschwind | H04L 63/064 |
| 2017/0208085 A1 | 7/2017 | Steelman | |

FOREIGN PATENT DOCUMENTS

WO  WO-2016064433 A1  4/2016

OTHER PUBLICATIONS

Nishit Majithia, "Honey-system: Design, Implementation & Attack Analysis," May 2017, 69 pages, <https://security.cse.iitk.ac.in/sites/default/files/15111024.pdf>.

(Continued)

*Primary Examiner* — Edward Zee
*Assistant Examiner* — Leynna Truvan
(74) *Attorney, Agent, or Firm* — Hewlett Packard Enterprise Patent Department (57) ABSTRACT

Examples disclosed herein relate to determining malware using firmware of a computing device. Firmware can be used to determine that an indication is present that malware is present on the computing device. The firmware can be executed to perform a security action in response to the indication that malware is present on the computing device.

10 Claims, 4 Drawing Sheets

(56) References Cited

OTHER PUBLICATIONS

Sean Berry, "Ms17-010 and the Wannacry Vulnerability: Patching, Compliance, and Secops Response," May 13, 2017, 34 Pages, <https://communities.bmc.com/community/bmcdn/bmc_service_automation/server_configuration_automation_bladelogic/blog/authors/sean_berry>.

Extended European Search Report received in EP Application No. 18151569.3, dated Jul. 3, 2018, 11 pages.

Moore, C., "Detecting Ransomware with Honeypot Techniques," Aug. 2, 2016, pp. 77-81, https://www.computer.org/csdl/proceedings/ccc/2016/2657/00/2657a077-abs.html.

* cited by examiner

DETERMINE MALWARE USING FIRMWARE

BACKGROUND

Service providers and manufacturers are challenged to deliver quality and value to consumers, for example by providing access to computing capabilities. A data center is a facility used to house computer networks, computer systems, and associated components, such as telecommunications and storage systems. Equipment in a data center may be in the form of servers mounted in rack cabinets. Data centers can be the target of malware attacks such as ransomware.

BRIEF DESCRIPTION OF THE DRAWINGS

The following detailed description references the drawings, wherein.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Entities can seek to avoid security attacks by identifying vulnerabilities in their datacenters. A vulnerability can include a flaw and/or weakness in the datacenter's network's design, implementation, operation, and/or management that could be exploited to violate the network's security policy (e.g., a circumstance and/or event with the potential to adversely impact a network through unauthorized access, destruction, disclosure, and/or modification of an asset of the entity). An exploit can include computer-readable instructions, data, and/or a sequence of commands that takes advantage of a vulnerability to cause unwanted and/or unanticipated behavior. A security attack can include a use and/or attempted use of an exploit against a vulnerability. To avoid subsequent security attacks, an entity can perform an investigation (e.g., forensic investigation) to determine what exploits were used against what vulnerabilities during the security attack.

Based on the threat intelligence and market research reports, it is clear that there has been an increased number of attacks targeted at operating systems, firmware and hardware layer using malware. For example, malware for ransom purposes and for disrupting economy, national security, and/or critical infrastructure. Attacks continue to change and become more sophisticated with ease of availability of malware and ransomware exploit kits from the dark web.

Some of the attacks are targeted at encrypting the boot block (e.g., a master boot record (MBR)) along with the data and recent attacks have created havoc among many small and medium size businesses as well as enterprises. As used herein, a boot block is an area of a storage device that is associated with initial instructions to be read by a processor of a computing device. Looking at the increased malware and ransomware, advanced persistent threats on hardware and firmware, and security trends, it can be advantageous to detect these sophisticated attacks and recover securely and automatically from these attacks. Such automatic detection and recovery solutions can be useful for computing system users to help recover their operating systems (OSes) and platform assets quickly and reduce the recovery time.

As used herein, malware is hostile or intrusive software. Examples include computer viruses, worms, Trojan horses, ransomware, spyware, adware, scareware, etc. Ransomware is a type of malware that threatens to publish a victim's data or block access to the data unless a ransom is paid. Some ransomware may lock the system being attacked. For example, the ransomware may encrypt a victim's files making them inaccessible. Some ransomware can be carried out using a Trojan that is disguised as a legitimate file that a user is tricked into downloading and opening. Other ransomware may travel between computers without user interaction. In some examples, malware, such as ransomware, can attempt to propagate itself using interfaces associated with the computing system that the malware is on, by scanning drives and interfaces associated with the computing system, writing to or modifying drives, etc.

Accordingly, an OS agnostic approach is described herein that helps to detect OS and platform attacks from firmware. In one example, a management processor, such as a baseboard management controller (BMC), can use honeypot technology to help detect the malware. An embedded storage or emulated storage accessible to the BMC can be provided to the OS. The BMC can determine that there is an indication of malware present on the computing device based on the honeypot technology. A security action can be performed in response to the indication.

In this example, an agentless monitoring and alerting approach is provided for detecting malware such as ransomware like attacks on a computing device such as a server platform using firmware. A physical embedded storage such as a flash storage (e.g., a NAND partition, a secure digital card, etc.), hard drive, etc., or an emulated disc storage from a BMC can be provided to the OS. Further, the storage can be accessible to the BMC. The storage can be configured to look like a partition with a boot block (e.g., a MBR) and additional data to mimic a production drive to the OS.

The BMC can monitor the storage for a malware or ransomware activity or pattern. If such activity is found, it indicates to the BMC that a potential threat is present. In one example, any write activity or continuous write activity within a time window to the storage can be considered an activity or pattern since the drive is not supposed to be manipulated. In other example, corruption, encryption, or other patterns can indicate the activity or pattern. Further, in some examples, the activity or pattern can be based on approaches used by one or more toolkit known for the malware attack approaches. For example, access and/or modification to a boot block can generate an anomaly event by the BMC. The anomaly event can trigger a security action of sending the anomaly event to a central management system (CMS). The anomaly event may include additional information, for example, logs associated with the activity, OS logs, system logs, etc. Further the anomaly event notification may include analysis completed by the BMC.

Moreover, in some examples, a security action by the BMC may include actions to act autonomously, after validating the system state. Such a security action can include quarantining the system, shutting down the system and/or each interface to the system, backing up audit logs, etc. The process of sending anomaly events to the CMS can allow the verification of the authenticity and integrity of the event.

In another example, another approach using firmware can be used to detect malware. In this example, a tool can use a firmware interface, such as a unified extensible firmware interface (UEFI) application or other light weight bootable image to implement security diagnostics. A security diagnostics application can be executed on demand or based on an observed state of the computing system, for example, a repeated periodic failure or failure to launch the primary OS. In one example, the tool can be invoked by the firmware interface using a flag set by a BMC after a threshold for continuous boot failure events. In another example, a manual user input or a console log diagnostic indicating malware can be used to trigger the flag. The tool can have the capability to inspect storage drives, for example, to detect MBR encryption, encrypted data in a boot partition, look for specific signatures or patterns in the drives, etc. to detect malware, ransomware, or another advanced attack signature on storage drives.

In some examples, a boot partition is a partition in a storage that contains a boot loader, a piece of software that is intended to boot an OS. In some examples a boot partition can include a MBR. The tool can send diagnostics results to the BMC and/or to the CMS (e.g., via the BMC).

In some examples, the BMC can analyze console logs automatically for ransomware or other malware messages using pattern matching and/or anomaly detection either after repeated boot failure events or based on other configuration rules or policies. In response to detection of malware, the CMS can orchestrate recovery of the system and/or other systems communicatively coupled to the computing system.

Figure 1:
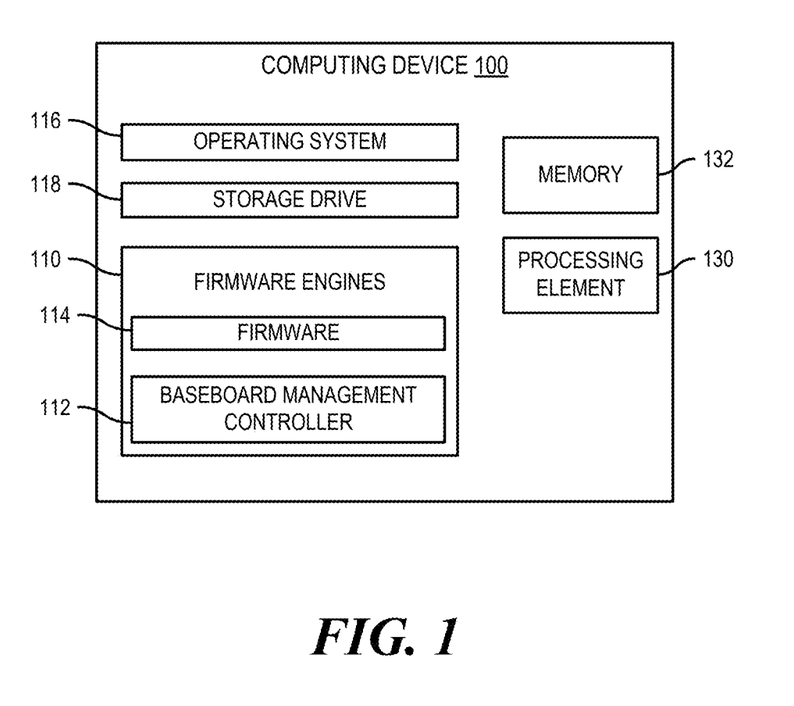
FIG. 1 is a block diagram of a computing device capable of performing a security action in response to determining that there is an indication of malware on the computing device, according to an example.

FIG. 1 is a block diagram of a computing device capable of performing a security action in response to determining that there is an indication of malware on the computing device, according to an example. Computing device 100 includes a firmware engines 110, which can include a BMC 112 and firmware executable by a processor or processing element, an operating system 116, a storage drive 118, a processing element 130, and memory 132.

Figure 2:
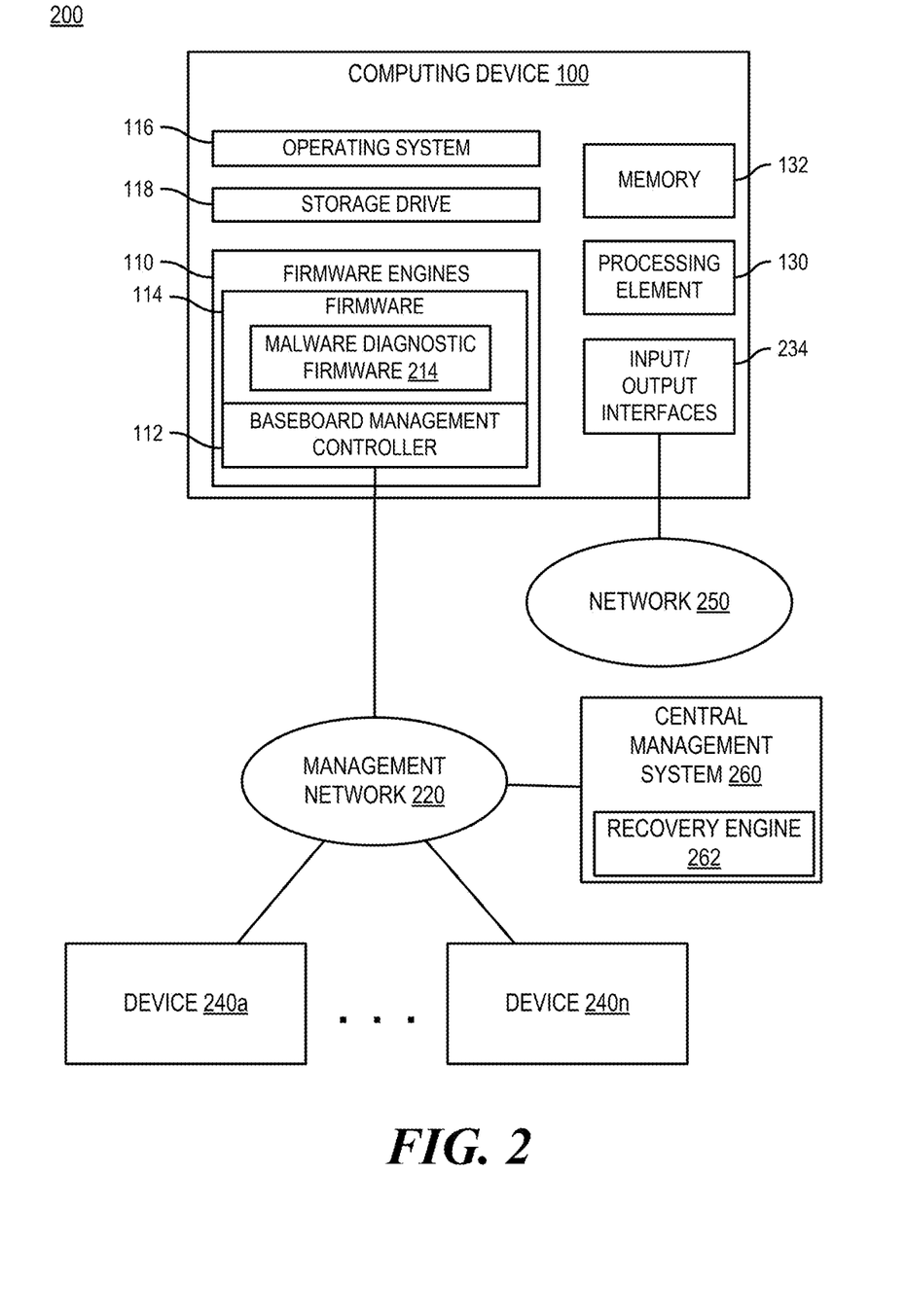
FIG. 2 is a block diagram of a computing system including a computing device capable of performing a security action in response to determining that there is an indication of malware on the computing device, according to an example.

FIG. 2 is a block diagram of a computing system including a computing device capable of performing a security action in response to determining that there is an indication of malware on the computing device, according to an example. System 200 can include computing device 100 as well as other devices 240a-240n connected together and to a Central Management System 260 via a management network 220. In one example, the CMS can include a recovery engine 262. Input/Output interfaces 234 of the computing device 100 can be used to communicate with other devices, for example, via a network 250. The input/output interfaces 234 may also be used to implement other input/output, for example, storage functionality (e.g., access to one or multiple storage arrays).

Though not detailed to help simplify explanation, the functionality described for computing device 100 can be used for devices 240a-240n. Further, devices 240 can be connected to one or multiple networks outside of the management network 220.

As noted above, firmware engines 110 can be used to monitor the computing device 100 for malware. The firmware engines 110 can be implemented as firmware instructions executing on at least one processor or physical processing element. In some examples, the processor can be a main processing element 130 of the computing device 100. In other example, a separate processor can be used. The firmware engines 110 can be used to determine that an indication of malware is present on the computing device 100. In response to the determination that the indication of malware is present, a security action can be performed.

In one example, the BMC 112 is used to determine that an indication of malware on the computing device 100 exists. The BMC 112 can be implemented using a separate processor from the processing element 130 that is used to execute a high level operating system 116. BMCs 112 provide so-called "lights-out" functionality for computing devices. The lights out functionality may allow a user, such as a systems administrator to perform management operations on the computing device 100, 240 even if an operating system is not installed or not functional on the computing device. Moreover, in one example, the BMC 112 can run on auxiliary power, thus the computing device 100, 240 need not be powered on to an on state where control of the computing device 100, 240 is handed over to an operating system 116 after boot. As examples, the BMC 112 may provide so-called "out-of-band" services, such as remote console access, remote reboot and power management functionality, monitoring health of the system, access to system logs, and the like. As used herein, a BMC 112 has management capabilities for sub-systems of a computing device 100, 240, and is separate from a processor or processing element 130 that executes a main operating system of a computing device (e.g., a server or set of servers).

As noted, in some instances, the BMC 112 may enable lights-out management of the computing device 100, which provides remote management access (e.g., system console access) regardless of whether the computing device 100 is powered on, whether a primary network subsystem hardware is functioning, or whether an OS 116 is operating or even installed. The BMC 112 may comprise an interface, such as a network interface, and/or serial interface that an administrator can use to remotely communicate with the BMC 112. As used herein, an "out-of-band" service is a service provided by the BMC 112 via a dedicated management channel (e.g., the network interface or serial interface) and is available whether the computing device 100 is in powered on state.

In some examples, a BMC 112 may be included as part of an enclosure. In other examples, a BMC 112 may be included in one or more of the servers (e.g., as part of the management subsystem of the server) or connected via an interface (e.g., a peripheral interface). In some examples, sensors associated with the BMC 112 can measure internal physical variables such as humidity, temperature, power supply voltage, communications parameters, fan speeds, operating system functions, or the like. The BMC 112 may also be capable to reboot or power cycle the device.

Operating System 116 is a system software that manages computer hardware and software resources and provides common services for computer programs. The OS 116 can be executable on processing element 130 and loaded to memory 132. The OS 116 is a high level OS 116 such as LINUX, WINDOWS, UNIX, a bare metal hypervisor, or other similar high level software that a boot firmware of the computing device 100 turns control of the computing device 100 to.

The storage drive 118 can be a hardware storage device or emulated by the BMC 112. The OS 116 is provided access to the storage drive 118. In one example, a bus can connect the storage drive 118 to the processing element 130, which can provide the storage drive 118 to the OS 116. In some examples, the storage drive 118 can include multiple partitions. For example, one partition may include firmware 114 that can be executed, for example firmware used for intelligent provisioning of the computing device 100. In other examples the storage drive 118 can be implemented using one of various technologies, such as a hard disk drive, a solid state drive, NAND flash, SD flash, etc. A hardware storage drive can also be accessible to the BMC 112, for example, via one or multiple buses, controllers, and interfaces.

In another example, the BMC 112 can present an emulated storage drive 118 to the OS 116. As such, in one example, the storage drive 118 can be presented as a virtual drive. Various current approaches can be used to provide such an emulated or virtual drive. For example, the BMC 112 may emulate a storage device interface to the processing element 130 via one or more bus or interface. For example, an Input Output (I/O) controller can be used as an interface, a southbridge, a super I/O chipset, etc. In one example, the storage device can be emulated to be connected via a Peripheral Component Interconnect (PCI) PCI-X, PCIe. In another example, another interface can be used, for example, a Universal Serial Bus (USB) storage device can be emulated and presented. In one example, the emulated USB storage device can be provided to the OS 116 via the processing element 130 and I/O controller (e.g., via a PCI bus). In some examples, the emulated storage device can be thinly provisioned to look like it has more capacity than actually available. In other examples, metadata provided with the emulated storage device can make it appear a certain way, even though actual information may not be real. In some examples, random data patterns or actual files can be used. In some examples, random data patterns can be customized for individual computing devices. For examples, a serial number or unique key can be used for generating one or more random data patterns.

In one example, on initial boot of the computing device into a service operating system (OS) or provisioning engine in a factory, a unique private and public key are generated and 'glued' onto the system by being saved into the BMC storage. This storage can be persistent and not replaceable. The BMC may allow access to a key using an application programming interface. The values can be written to a write once register on a same Application Specific Integrated Circuit (ASIC) as the BMC. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). An algorithm for random generation of data can be used based on the serial number or unique key associated with the computing device. Accordingly, it can be more difficult for an attacker to identify that the storage drive 118 is acting as a honeypot.

The storage drive 118 can be implemented as a honeypot. A honeypot includes data that appears to be a legitimate part of the computing device, but is actually isolated and monitored by the firmware engines 110, for example, the BMC 112. As noted, the storage drive 118 can be implemented to mimic information or resources of value to an attacker. In one example, the storage drive 118 can include mimicked information representing a boot block such as an MBR. Other data can be mimicked to represent resources and/or information of value to an attack vector, such as an OS, video files, databases, picture files. In some examples, the mimicked data can be based on particular attack vectors of particular malware or toolkits (and can be abstracted). Moreover, in various examples, multiple storage drives can similarly be presented to the OS 116 representing different honeypots for malware.

The BMC 112 can monitor the storage drive 118. As noted above, the storage drive 118 is accessible by the operating system 116 and also capable of being monitored by the BMC 112. The BMC 112 can determine that there is an indication of malware present on the computing device 100. Monitoring may include tracking changes, modification, or other activity on the storage drive 118. The monitoring can be periodic or may be implemented using an interrupt system. For example, if the BMC 112 is emulating the storage drive 118, the BMC 112 can know when the storage drive 118 is being accessed. Because the storage drive 118 is not meant to have changes performed, a large number of resources from the BMC 112 do not need to be dedicated to implement the approach.

As used herein, an indication of malware represents that the BMC 112 for a reason suspects that malware may be present on the computing device. In one example, this can be based on a rule or criteria that is met. Various technologies can be used, for example, using a security information and event management (SIEM) mechanism, pattern matching, malware signature detection, regular expressions, etc. In one example, if a modification is made or attempted to be made to the data of the storage drive 118, an indication of malware is present. In another example, certain activity, such as scans of the data on the storage drive 118 can trigger an indication of malware. In some examples, the indication can be broader than actual confirmed malware being on the computing device.

In one example, the malware is ransomware. Ransomware is malware that threatens to publish a victim's data or block access to it unless a ransom is paid. Messages for ransomware may be part of a signature that can cause an indication of ransomware. Further, encryption or attempted encryption of data on the storage drive 118 can be considered an indicator of ransomware.

As noted, the BMC 112 can monitor the storage for a malware or ransomware activity, pattern, or signature. If such activity is found, it indicates to the BMC 112 that a potential threat or malware indicator is present. Further, in some examples, the activity or pattern can be based on approaches used by one or more toolkit known for the malware attack approaches. As such, activity detected on the storage drive 118 according to a pattern can cause an indication that malware, such as ransomware, is present on the computing device. In one example, the pattern can include modification to a mimicked boot partition, such as an MBR.

In response to the indication of malware in the computing device 100, the BMC 112 can perform a security action. In one example, the security action includes isolating the computing device 100 from other devices communicatively coupled to the computing device 100. This can be implemented, for example, by restricting access to or shutting down one or multiple input/output interfaces 234. In one example, the BMC 112 can also be put in a heightened security mode, for example, not responding to or allowing communications without particular (e.g., enhanced or multifactor) authentication. The heightened security mode can include restriction of functionality and may require particular security privileges. In some examples, the computing device 100 can be shut down into an auxiliary state (e.g., where the OS 116 is not running, but the BMC 112 is active) or an off state.

In a further example, the security action can include checking or restoring firmware on the computing device 100 to a previous state. Moreover, in another example, the security action can include sending the CMS 260 information associated with the computing device 100. The information can include various information, for example, log information used to determine the activity or pattern found, activity information, OS logs, system logs, analysis associated with the identification of the indicator, etc. In some examples, the BMC 112 can communicate with the CMS 260, which has the authentication credentials to access the BMC 112 in the heightened security mode because of particular security privileges associated with the CMS 260 authentication credentials.

In another example, another one of the firmware engines 110 can detect indication of malware. For example, a tool, such as malware diagnostic firmware 214 can be implemented as a firmware interface, such as a unified extensible firmware interface (UEFI) application or other light weight bootable image to implement security diagnostics. A security diagnostics application can be executed on demand or based on an observed state of the computing device 100, for example, a repeated periodic failure or failure to launch a primary OS 116. In one example, the tool can be invoked by the firmware interface using a flag set by a BMC 112 after a threshold for continuous boot failure events. In another example, a manual user input or a console log diagnostic indicating malware can be used to trigger the flag.

The malware diagnostic firmware 214 can have the capability to inspect storage drives, for example, to detect MBR encryption, encrypted data in a boot partition, look for specific signatures or patterns in the drives, etc. to detect malware, ransomware, or another advanced attack signature on storage drives. The tool can send information such as diagnostics results and/or log information to the BMC 112 and/or to the CMS 260 (e.g., via the BMC). In some examples, the BMC 112 can analyze console logs automatically for ransomware or other malware messages using pattern matching and/or anomaly detection either after repeated boot failure events or based on other configuration rules or policies.

In response to detection of malware, the CMS 260 can validate presence of malware as well as orchestrate recovery of the system and/or other systems communicatively coupled to the computing system. In one example, the CMS 260 can receive information about the potential malware from the BMC 112. The information can be processed by the CMS 260 to validate that the malware is present on the computing device 100 or determine that malware is not present. The information can include raw data such as log information as well as malware diagnostic results from one of the firmware engines 110.

If the malware is not present, the computing device 100 can continue to process data, or, if processing or communications have been disabled, quarantined, or throttled, resume normal functioning of the computing device 100. If the malware is determined to be present, a recovery engine 262 can be implemented to initiate a recovery process. The recovery process can include recovery of configuration settings for the computing device 100 as well as installation of a new OS on the computing device 100. In some examples, the recovery process can also include validating that firmware is not potentially exposed to the malware and/or re-flash and recovery of one or more pieces of firmware.

In one example, a secure recovery protocol can be implemented that allows for the automatic recovery of the server OS and other platform assets using the embedded BMC and CMS 260. The CMS 260 can have the functionality to administer recovery policies to the BMC 112, which includes actions that should be taken upon detecting a firmware or OS attack. As part of the recovery administration, the identity of the CMS 260 can be stored in a secure partition inside the computing device to allow communication with the CMS 260 when a breach is detected. This can be part of the authentication credentials used to allow for an authenticated communication between the BMC 112 and the CMS 260.

A backup of the configuration of the computing device 100 that includes each of the firmware, IO card settings, etc. can be securely stored for use with the CMS 260 along with the identity/certificate of the computing device 100 to verify signed breach alerts and also communicate securely using mutual authentication during the recovery phase. In one example, when the BMC 112 is configured with a recovery policy from a CMS 260, the BMC 112, upon detecting a breach will automatically go to a secure internal mode allowing communication only for the highest privilege users (security recovery privilege) using mutual authentication using the credentials/identity stored in a secure partition.

In various examples, the CMS 260 also supports policies like server quarantine, platform forensic analysis, and automated recovery of the configuration, firmware, and OS using a baseline securely stored in the CMS 260 or an external secure image vault. The quarantine action can involve configuring the BMC 112 to only allow login from users with security recovery privilege, disabling all insecure services, take a OS dump (in case of firmware attacks with valid OS) shutdown network and IO ports, etc. The recovery engine 262, upon detecting a breach based on a signed alert from a managed computing device 100 orchestrates the recovery process using the configured policies using a snapshot of the OS image in the recovery baseline. In some examples, the recovery process can be initiated using an image containing advanced repairing and reimaging software which is mounted using a BMC virtual media interface. This repair and reimaging image can contain software to look at inventory data from last boot and, using an internal or external secure data vault, identify and restore the images on one or more disk drives along with application specific data.

In some example, in order to recover, one or multiple non-volatile memories may be returned to "factory" conditions (e.g., erased, written to a particular value, etc.) in order to eliminate corruption issues and eliminate the incorrect behavior. Firmware operations may be used to erase or re-program non-volatile storage (e.g., Serial Peripheral Interface (SPI) parts, electrically erasable programmable Read Only Memory (EEPROM), etc.).

In one example, in response to the signal, the BMC 112 will set the computing system to a recovery state, for example, by performing a low-level, simple erase of multiple components that it is capable of erasing/programming. Firmware can be intelligently set such that firmware can recover from the recovery state as further described herein. Setting the firmware to a base state provides a reset scenario that can more easily be recovered from than one where corrupt values may still exist in the components. Configuration settings can then be restored from a baseline image (e.g., a baseline stored on the computing device or in a storage associated with the recovery engine 262).

Examples of firmware engines 110 that can be recovered include a baseboard management controller (BMC), an Input Output controller (I/O controller), a southbridge, super I/O, platform firmware controllers, etc.

In some examples, the BMC 112 can autonomously perform one or more of the recovery actions without management from the CMS. In other examples, the BMC 112 sends communications to the CMS 260 as described and the CMS 260 can orchestrate recovery. In some examples, the BMC 112 can autonomously perform some security/recovery actions, while others are orchestrated via the CMS 260.

As noted, each device 100, 240a-240n can include a BMC such as BMC 112 through which the devices communicate with the CMS 260 via management network 220. In some examples, the management network 220 can be a private network that is not accessible outside (e.g., available to a production network or via the Internet). In other examples, a connection can be provided (e.g., via a firewall) to another network environment. The CMS 260, which itself may comprise a computer, provides a point of control for management purposes for the devices. In some examples, the CMS 260 can be implemented as a virtual machine executing on a device such as the computing device 100, device 240, a server, a workstation, etc. In one example, the CMS 260 can be used by a person to manually, or via a script, load an operating system into a device, enable and disable various server features, and the like.

The data connectivity between the devices 100, 240 and CMS 260 forms a local area network (LAN) that, in accordance with various examples, is used primarily or exclusively for system management purposes, that is, not to process data in accordance with the principle functionality of the devices. Thus, the management network 220 is generally not used to process data transactions. One of the functions of the CMS 260 is to orchestrate recovery of one or more systems using recovery engine 262.

In certain examples, the computing device 100 and devices 240 can be implemented as computers such as servers. In other examples, the devices can include special purpose machines. The computing device 100, devices 240, and/or CMS 260 can be implemented via a processing element, memory, and/or other components.

Communication networks 220, 250 can use wired communications, wireless communications, or combinations thereof. Further, the communication networks 220, 250 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication networks 220, 250 can be in the form of a direct network link between devices. Various communications structures and infrastructure can be utilized to implement the communication network(s).

By way of example, the devices communicate with each other and other components with access to a communication network via a communication protocol or multiple protocols. A protocol can be a set of rules that defines how nodes of the respective communication network interact with other nodes. Further, communications between network nodes can be implemented by exchanging discrete packets of data or sending messages. Packets can include header information associated with a protocol (e.g., information on the location of the network node(s) to contact) as well as payload information.

Processing element 130 may be, one or multiple central processing unit (CPU), one or multiple semiconductor-based microprocessor, one or multiple graphics processing unit (GPU), other hardware devices suitable for retrieval and execution of instructions stored in machine-readable storage medium, or combinations thereof. The processing element 130 can be a physical device. Moreover, in one example, the processing element 130 may include multiple cores on a chip, include multiple cores across multiple chips, multiple cores across multiple devices (e.g., if the computing device 100 includes multiple node devices), or combinations thereof. Processing element 130 may fetch, decode, and execute instructions. As an alternative or in addition to retrieving and executing instructions, processing element 130 may include at least one integrated circuit (IC), other control logic, other electronic circuits, or combinations thereof that include a number of electronic components for performing the functionality of instructions.

Engines, such as the firmware engines 110 and recovery engine 262, include hardware and/or combinations of hardware and programming to perform functions provided herein. Functionality attributed to a particular engine may also be implemented using another engine. In some examples, the engines can be implemented, using a processing element and instruction and/or using an application specific integrated circuit (ASIC).

As noted, input/output interfaces 234 may additionally be provided by the computing device 100. For example, input devices, such as a keyboard, a sensor, a touch interface, a mouse, a microphone, etc. can be utilized to receive input from an environment surrounding the computing device 100. Further, an output device, such as a display, can be utilized to present information to users in some examples. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234. Similarly, storage devices, for example arrays, may use communications via input/output interfaces 234. For example, a storage area network may be attached to the computing device 100 or one or multiple storage drives can be attached via input/output interfaces 234.

In various examples, the CMS 260 may provide additional functionality. For example, the CMS 260 can provide capabilities to, at a large scale, inventory and update firmware, operating systems, drivers, software, and/or other capabilities in devices. The CMS 260 may also be capable to manage licenses for devices in a datacenter. Moreover, the CMS 260 can discover and take an inventory of devices on the management network 220. The CMS 260 may also be capable to support both online and offline firmware and driver updates. In some examples, batch updates can be done sequentially.

In one example, the CMS 260 can take an inventory of configuration settings, firmware levels, software information, etc. about the devices. The inventory can be stored in a storage coupled to the CMS 260. Moreover, the storage may include firmware/software images of tools that can be used to recover the respective devices.

Figure 3:
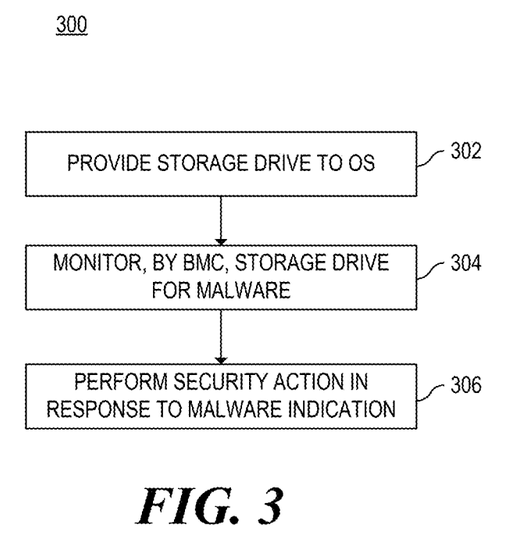
FIG. 3 is a flowchart of a method for performing a security action in response to an indication of malware, according to an example.
Figure 4:
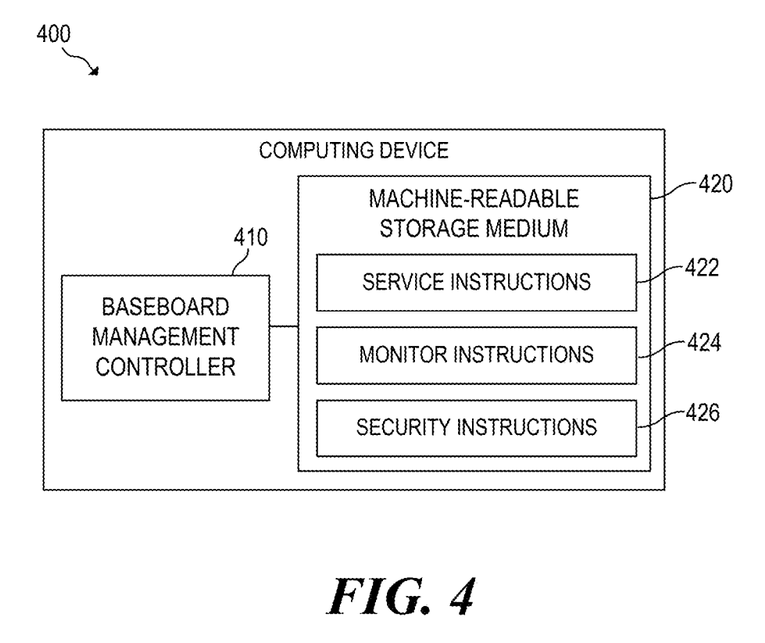
FIG. 4 is a block diagram of a computing device including a baseboard management controller capable of performing a security action in response to an indication of malware, according to an example.

FIG. 3 is a flowchart of a method for performing a security action in response to an indication of malware, according to an example. FIG. 4 is a block diagram of a computing device including a baseboard management controller capable of performing a security action in response to an indication of malware, according to an example.

Although execution of method 300 is described below with reference to computing device 400, other suitable components for execution of method 300 can be utilized (e.g., computing device 100 using BMC 112). Method 300 may be implemented in the form of executable instructions stored on a tangible machine-readable storage medium, such as storage medium 420, and/or in the form of electronic circuitry.

The computing device 400 can run a high level software such as an operating system as instructions on a machine-readable storage medium and a processing element (not shown). The BMC 410 can be implemented using a separate processing element from the processing element executing the OS. As such, the BMC 410 is implemented using a separate controller. As noted above, the BMC 410 can also provide out of band services for the computing device 400. In one example, the out of band services can be provided by executing service instructions 422.

At 302, the computing device can provide a storage drive to the OS that is capable of being monitored by the BMC 410. A central processing element (e.g., a central processing unit (CPU)) can be provided access to the storage drive. Further, the BMC 410 can be provided access to the storage drive. As noted above, in one example, the storage drive can include a physical medium, such as a flash memory and in another example, the storage drive can be implemented by the BMC 410, as part of one of the out of band services that the BMC 410 provides. As such, in one example, the BMC 410 can execute service instructions 422 to provide a storage drive as a virtual or emulated drive to the OS. Moreover, as noted above, the storage drive can include a mimicked boot sector (e.g., including MBR data) as well as other data mimicked to look like data valuable to one or multiple malware or ransomware attack vector. In some examples, because the BMC 410 has access to the storage drive, the BMC 410 can update the storage drive to look valuable to new attack vectors as the new attack vectors arise.

At 304, the BMC 410 can execute monitor instructions 424 to monitor the storage drive acting as a honeypot for an indication of malware. The BMC 410 can determine, while monitoring, that an indication that malware is present exists based on activity detected at the storage drive. The malware can be indicative of ransomware or other persistent threat. The activity detected can be part of a pattern or signature detected on the storage drive by the BMC 410. In one example, the indication can be an indication that a rule, criteria, pattern, or signature that is representative of potential malware is present has been hit. As noted above, the indication can include modification or attempted modification to a part of the storage drive, for example, mimicked MBR data.

In response to the indication, at 306, the BMC 410 can execute security instructions 426 to perform a security action in response to malware indication. As noted above, the security action can include isolating the computing device 400, for example, by shutting down a plurality of interfaces of the computing device 400. Further, the security action can include notifying a CMS of the indication via a management network. Moreover, in some examples, the security action can include checking firmware status of the computing device compared to a hash and recovering firmware (e.g., re-flashing) if it has been compromised. In some examples, one or more parts of the recovery or isolation can come in response to receiving a communication from the CMS. The indication as well as information associated with the potential malware can be sent to the CMS. The information can include analysis by the BMC 410 or other firmware, information about the activity or pattern detected to cause the indication, etc. As noted above, the BMC 410 can go into a secure mode that requires a certain level of privileges (e.g., via authentication to a privilege level). Communications with the CMS can be authenticated to that privilege level.

BMC 410 may be, one or multiple processor, microcontroller, or other hardware devices suitable for retrieval and execution of instructions stored in machine-readable storage medium 420, or combinations thereof. The BMC 410 can be a physical device. Moreover, in one example, the BMC 410 may fetch, decode, and execute instructions 422, 424, 426 to implement method 300. As an alternative or in addition to retrieving and executing instructions, BMC 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, in one example, machine-readable storage medium 420 may be encoded with a series of executable instructions for implementing method 300.

Figure 5:
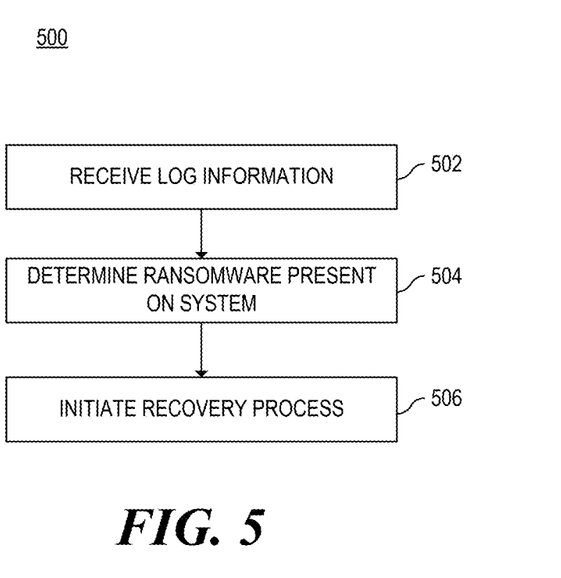
FIG. 5 is a flowchart of a method for initiating a recovery process based on confirmation of a firmware indication that ransomware is present on a system, according to an example.
Figure 6:
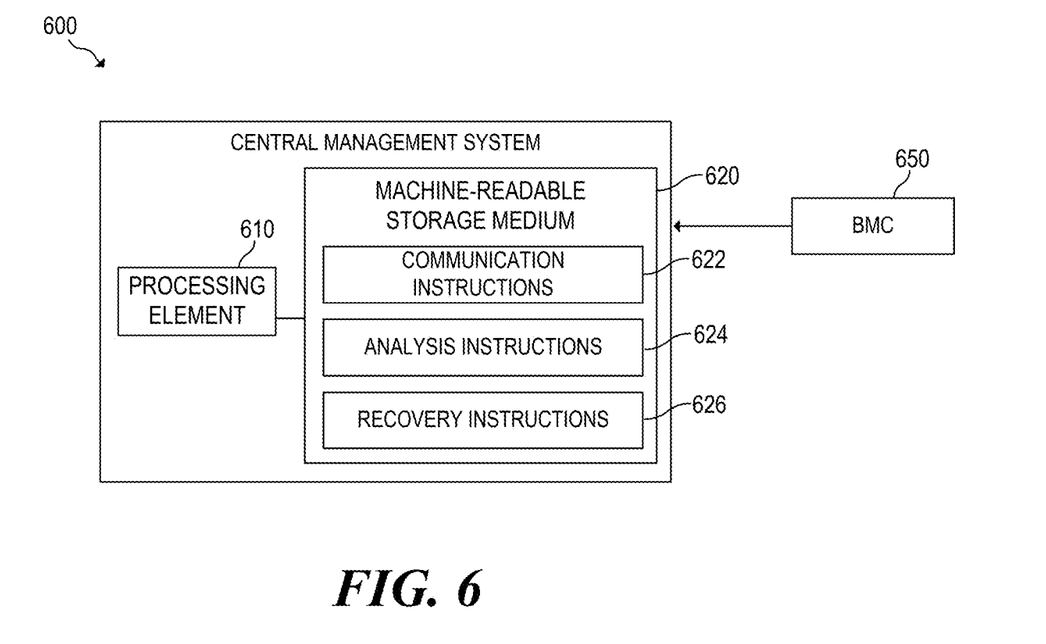
FIG. 6 is a block diagram of a central management system capable of initiating a recovery process on a computing system based on firmware indication of ransomware, according to an example.

FIG. 5 is a flowchart of a method for initiating a recovery process based on confirmation of a firmware indication that ransomware is present on a system, according to an example. FIG. 6 is a block diagram of a central management system capable of initiating a recovery process on a computing system based on firmware indication of ransomware, according to an example.

Method 500 may start at 502, where the CMS 600 receives information about an indication of malware from a BMC 650. The information can include log information, for example, information collected about activity or attempted activity at a storage device that the BMC 650 is monitoring. The communication with the BMC 650 can be authenticated. Communication instructions 622 can be executed by processing element 610 to implement authenticated communications. Further, the CMS 600 can have a privilege level to communicate with a BMC 650 that is in an elevated security level that requires a particular level of authentication that the authenticated communication meets, for example, via an exchange of tokens or credentials.

At 504, the processing element 610 can execute analysis instructions 624 to determine whether malware (e.g., ransomware) is present according to the information received. Analysis can include verification using a SIEM or other security analysis approach such as pattern detection, signature detection, etc. In one example, the log may show that the indication was caused by activity caused by a defragmentation algorithm of the computing device and not malware. In another example, the log may show that the indication was caused by malicious activity.

In response to the verification, at 506, recovery instructions 626 can be executed to initiate a recovery process on the computing device associated with the BMC 650. The CMS 600 can orchestrate the recovery of the computing device. The recovery can include recovery of configuration settings of the computing device and installation of a new operating system on the computing device. The new operating system can be installed via a virtual media interface presented to the computing device via the BMC 650. In some examples, this recovery can include either verifying firmware on the computing device or re-flashing firmware to a controlled baseline level. Baseline restored configuration settings can be customized for the environment that computing device is in rather than a base firmware for the computing device. Moreover, the installation of the fresh operating system on top of the baseline firmware can provide a safe and secure operating environment. This can be particularly useful in a datacenter where clustered machines can be easily replaced and provisioned and user data is separately stored on storage (e.g., using a storage array).

As noted above, the CMS 600 can be implemented as a virtual machine on a computing device. In other examples, the CMS 600 can be implemented as a separate computing device or as part of multiple machines.

Processing element 610 may be, one or multiple central processing unit (CPU), one or multiple semiconductor-based microprocessor, one or multiple graphics processing unit (GPU), other hardware devices suitable for retrieval and execution of instructions stored in machine-readable storage medium 620, or combinations thereof. The processing element 610 can be a physical device. Moreover, in one example, the processing element 610 may include multiple cores on a chip, include multiple cores across multiple chips, multiple cores across multiple devices (e.g., if the CMS 600 includes multiple node devices), or combinations thereof. Processing element 610 may fetch, decode, and execute instructions 622, 624, 626 to implement method 500. As an alternative or in addition to retrieving and executing instructions, processing element 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for implementing method 500.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing system comprising:
   a computing device including:
      at least one processing element;
      memory;
      firmware engines including:
         a baseboard management controller (BMC) separate from the at least one processing element to provide at least one out of band service for the computing device, wherein the BMC is to:
      provide a virtual drive as a storage drive to an operating system to execute on the at least one processing element, wherein the virtual drive is to act as a honeypot and is thinly provisioned to appear to include a resource of value;
      monitor the storage drive accessible by the operating system;
      determine that an indication is present that malware is present on the computing device;
      send log information associated with the activity pattern to a central management system via an authenticated communication; and
      perform a security action in response to the indication that malware is present on the computing device, wherein the BMC is elevated, as part of the security action, to a security level requiring a level of authentication that the authenticated communication meets; and
   the central management system (CMS) to:
      determine that the log information indicates that the malware is present; and
      initiate a recovery process including recovery of configuration settings for the computing device and installation of a new operating system on the computing device via a virtual media presented by the BMC.

2. The computing system of claim 1, wherein the storage drive includes mimic master boot partition data and other data is indicative of an operating system.

3. The computing system of claim 1, wherein the security action includes isolating the computing device from a plurality of other devices communicatively coupled to the computing device.

4. The computing system of claim 1, wherein the computing system further includes a firmware to execute on the at least one processing element during boot to:
   determine, from a pattern of boot failures, that the indication of the malware is present;
   launch a malware diagnostic to determine malware diagnostic results; and
   send the malware diagnostic results to the BMC, wherein the BMC is further to send the malware diagnostic results to the CMS via the authenticated communication, and wherein the validation of the log information is further based on the malware diagnostic results.

5. The computing system of claim 1, wherein the virtual drive thinly provisioned to appear to include the valuable resource using metadata even though the valuable resource is not real.

6. A method comprising:

providing, by a baseboard management controller (BMC) at least one out of band service for a computing device, wherein the BMC is separate from a central processing element to execute an operating system for the computing device;

monitoring, by the BMC a honeypot storage device as a virtual drive that is thinly provisioned to appear to have more capacity than actually available and presented to the operating system by the BMC;

determining, by the BMC that, based on the monitoring, an activity pattern exists indicative that ransomware is present on the computing device; and performing, by the BMC, a security action in response to the determination that the activity pattern indicative of ransomware is present on the computing device;

sending, by the BMC, log information associated with the activity pattern to a central management system (CMS) via an authenticated communication, wherein the BMC is elevated, as part of the security action, to a security level requiring a level of authentication that the authenticated communication meets;

determining, by the CMS, that the log information indicates that the ransomware is present; and initiating, by the CMS, a recovery process including recovery of configuration settings for the computing device and installation of a new operating system on the computing device via a virtual media presented by the BMC.

7. The method of claim 6, further comprising:

as part of the security action, quarantining, by the BMC, the computing device.

8. The method of claim 6, wherein the storage drive includes mimic master boot record data and other data, wherein the pattern includes modification to the mimic master boot record data.

9. A non-transitory machine-readable storage medium storing instructions that, if executed by a baseboard management controller (BMC) of a computing device, cause the BMC to:

provide at least one out of band service for the computing device, wherein the BMC is separate from a central processing element to execute an operating system for the computing device;

monitor a honeypot storage device as a virtual drive that is thinly provisioned to appear to have more capacity than actually available and presented to the operating system by the BMC, wherein the honeypot storage device includes a mimic master boot record and other data;

determine, based on the monitor, an activity pattern exists indicative that ransomware is present on the computing device, wherein the pattern includes modification to the mimic master boot record data; and perform, security action in response to the determination that the activity pattern indicative of ransomware is present on the computing device;

send log information associated with the activity pattern to a central management system (CMS) via an authenticated communication, wherein the BMC is elevated, as part of the security action, to a security level requiring a level of authentication that the authenticated communication meets; and receive an instruction from the CMS to perform a recovery process including recovery of configuration settings for the computing device and install of a new operating system on the computing device via a virtual media presented by the BMC.

10. The non-transitory machine-readable storage medium of claim 9, wherein the BMC is further caused to quarantine the computing device.

* * * * *